United States Patent [19]

Fry

[11] 4,124,554
[45] Nov. 7, 1978

[54] POST-FORMED AQUEOUS PHENOLIC RESIN DISPERSIONS

[75] Inventor: John S. Fry, Hillsborough Township, Somerset County, N.J.

[73] Assignee: Union Carbide Corporation, New York, N.Y.

[21] Appl. No.: 765,300

[22] Filed: Feb. 3, 1977

[51] Int. Cl.² .............................................. C08L 61/10
[52] U.S. Cl. ........................... 260/29.3; 260/29.2 EP; 260/29.2 UA; 260/29.6 NR; 428/290; 428/460; 428/528; 428/531
[58] Field of Search ..................... 260/29.3, 844, 59 R, 260/29.6 NR

[56] References Cited

U.S. PATENT DOCUMENTS

| 2,392,686 | 1/1946 | Murdock | 260/844 |
|---|---|---|---|
| 2,443,893 | 6/1948 | Collins | 260/29.3 |
| 2,902,459 | 9/1959 | Teppema | 260/844 |
| 3,221,079 | 11/1965 | Harris | 260/29.3 |
| 3,433,701 | 3/1969 | Armour | 260/844 |
| 3,719,616 | 3/1973 | Ingram | 260/29.3 |
| 3,857,721 | 12/1974 | Hayashi | 260/51 R |
| 3,870,669 | 3/1975 | Hofel et al. | 260/29.3 |
| 3,870,669 | 3/1975 | Hofel | 260/29.3 |
| 3,871,900 | 3/1975 | Hayashi et al. | 117/36.8 |
| 3,900,218 | 8/1975 | Miyamoto et al. | 282/27.5 |

Primary Examiner—Theodore E. Pertilla
Attorney, Agent, or Firm—Franklyn Schoenberg

[57] ABSTRACT

There is disclosed a process for producing a dispersion of a phenolic resin in water by mixing a pre-formed, solid, substantially water-insoluble, phenolic resin with water, an organic coupling solvent, and polyvinyl alcohol. The resulting dispersions are especially useful in coatings applications.

16 Claims, No Drawings

POST-FORMED AQUEOUS PHENOLIC RESIN DISPERSIONS

The invention relates to aqueous phenolic dispersions and to a process for making them.

BACKGROUND OF THE INVENTION

Aqueous dispersions of phenolic resins are becoming more important commercially in many end-use areas, such as coatings, adhesives, fiber bonding, and the like. An important advantage of such aqueous dispersions is the reduction in environmental pollution that is obtained because the use of organic solvents is reduced or eliminated, and/or the proportion of unreacted phenol and/or formaldehyde in the phenolic resins used in aqueous dispersions is sharply reduced.

Two different approaches have been used to produce aqueous phenolic resin dispersions. One is basically an in situ preparation wherein the phenol and aldehyde (usually formaldehyde) are reacted in an aqueous medium, and are dispersed therein with the aid of an interfacial agent without having been isolated from the aqueous reaction medium. Examples of such in situ preparations include Harding, U.S. Pat. No. 3,823,103 and Ingram, U.S. Pat. No. 3,666,694.

The second approach utilizes a pre-formed phenolic resin which is dispersed in water in various ways, typically, either by first dissolving the resin in an organic solvent and emulsifying the solution with the help of a surface active agent, or by pulverizing the resin to a very fine particle size and dispersing it in water with a surface active agent. Both approaches suffer from the disadvantage of requiring the use of a surfactant. This can be disadvantageous in many end-use applications, e.g., coatings, because water resistance may be impaired. Dispersions made by using pulverized phenolic resin tend to be gritty, which makes them unsuitable for surface coating applications.

THE PRIOR ART

Starck et al., in German Patent Specification No. 838,215, discloses phenolic dispersions made by dissolving a phenolic resin in an organic solvent, and then dispersing the solution in water with the aid of a soap-like emulsifier and polyvinyl alcohol.

German OS 2,034,136 describes a phenolic resin dispersion made by reacting a phenol with an aldehyde in the presence of a transition metal salt of an organic acid, to produce a condensation product which is liquified by warming and then dispersed in water using hydroxyethyl-cellulose and a non-ionic surfactant.

Armour, in U.S. Pat. No. 3,433,701 produces mixed dispersions by adding an organic solvent solution of a B-stage phenolic resin to an aqueous polyvinyl acetate emulsion, said emulsion being stabilized with polyvinyl alcohol. Coatings made from this sytem have poor corrosion resistance because of the polyvinyl acetate.

In German Pat. No. 1,023,882, certain condensates of formaldehyde with phenol, epoxides, or furfuryl alcohol are dispersed in aqueous polyvinyl alcohol by codispersing the condensate with a low molecular weight formaldehyde-xylenol resole resin. Some methanol was present in the resins and in the dispersion.

In German Pat. No. 878,556, higher molecular weight xylenol-formaldehyde resins were dispersed in aqueous polyvinyl alcohol using methanol or methanol-ethyl acetate solvents. It is difficult to make acceptable coatings from this system because methanol is too volatile and ethyl acetate is not miscible with water.

SUMMARY OF THE INVENTION

The invention provides a process for the production of an aqueous dispersion of a solid, substantially water-insoluble, phenolic resin. The process comprises mixing:

(a) a pre-formed, solid, substantially water-insoluble, phenolic resin;
(b) water;
(c) an organic coupling solvent; and
(d) polyvinyl alcohol, at a temperature and for a period of time sufficient to form a dispersion of said phenolic resin in water. The invention also provides the new and useful dispersions produced by said process, many of which are particularly useful in various coatings and adhesive applications.

DEFINITIONS

Solid — As used herein, the term "solid" refers to a phenolic resin whose glass transition temperature is substantially above room temperature, e.g., above about 35° C.

Substantially water-insoluble — As used herein, the term "substantially water-insoluble" refers to a phenolic resin that is not soluble in or miscible with water, although a small percentage of low molecular weight components in the resin may be water-soluble.

DESCRIPTION OF THE INVENTION

A convenient method for carrying out the process of the invention is the following The polyvinyl alcohol is first dissolved in a mixture of water and coupling solvent, and the solid phenolic resin is then added slowly while increasing the agitation and temperature of the mixture. After agitating at high speed to temperatures of 55°–75° C., the dispersion forms without scrap or wasted material. Subsequent batches of the dispersion can be prepared immediately without having to clean the equipment. Laboratory scale batches were made using a Waring blender, but larger scale batches have been made with a lower speed Cowles dissolver. A Cowles dissolver is a spinning propeller type of mixer. A commercial homogenizer is not necessary but can be used if desired. Not all of the water in the formulation need be added at first. This creates a more solvent-rich medium which, in some cases, eases the dispersion formation. The remainder of the water is added after the dispersion is formed to achieve the desired water-coupling solvent ratio.

The phenolic resins that are employed in the invention are well known compositions. They are solid resoles or novolaks. The resoles employed are normally base catalyzed resins having a formaldehyde factor (i.e., parts, by weight, of 40 weight percent aqueous formaldehyde per 100 parts by weight of unsubstituted phenol) of the order of about 90 to about 180. The novolaks employed are normally acid catalyzed resins having a formaldehyde factor of the order of from about 50 to about 75.

The phenol employed for producing the phenolic resins of the invention can be unsubstituted phenol, or it can be a substituted phenol such as cresol, bisphenol-A, para-substituted phenols such as para-t-butylphenol, para-phenylphenol, and the like. Ordinarily, formaldehyde or a material that generates formaldehyde in situ is the aldehyde that is employed to make the phenolic resin.

One particularly desirable phenolic resin for use in the invention is a resole produced by reacting formaldehyde with bisphenol-A in a mol ratio of from about 2 to about 3.75 moles of formaldehyde per mole of bisphenol-A, in the presence of a catalytic amount of an alkali metal or barium oxide or hydroxide condensation catalyst, the reaction being carried out at elevated temperatures. The condensation reaction product is then neutralized to a pH of from about 3 to about 8. This phenolic resin is disclosed in co-pending application Ser. No. 757,061 filed Jan. 5, 1977, which is assigned to the same assignee as this application. The parent application of Ser. No. 757,061 has issued in Great Britain as British Pat. No. 1,417,437, on July 18, 1973. This phenolic resin is especially useful in the production of baked coatings for metals.

Another particularly useful type of phenolic resin is a novolak prepared from formaldehyde and phenol, wherein the phenol is predominantly a para-substituted phenol such as para-t-butylphenol or para-phenylphenol, for use as a coating on carbonless copy paper. The phenolic resin is employed as an acidic developing material on the paper. One valuable phenolic resin for such use is a novolak prepared from a mixture of 20 percent by weight of unsubstituted phenol and 80 percent by weight of t-butylphenol, reacted with formaldehyde at a formaldehyde factor of 50, in the presence of an acid catalyst.

The nature and production of the phenolic resins that are employed in the invention are well known in the art.

It is a valuable feature of the invention that the phenolic resin that is employed need not be pulverized or ground to a very fine particle size, and it need not be dissolved in an organic solvent, prior to utilization in the process of the invention in the preparation of aqueous dispersion. The phenolic resin will most typically be employed in the form of lumps, flakes, or a coarse ground powder.

The invention also employs a coupling solvent, that is, a solvent that is miscible with water and which is a solvent for the phenolic resin employed. The miscibility with water should be complete, and the phenolic resin should be soluble in the coupling solvent such that solutions of up to about 80 weight percent phenolic resin (based on solution weight) can be made. The boiling point of the coupling solvent is preferably within the range of from about 75° C. to about 230° C. More volatile solvents, such as methanol and acetone, cause blistering in coatings made from the dispersions, and often have dangerously low flash points.

Alcohols, glycol ethers, ethers, esters, and ketones have been found to be the most useful coupling solvents. Specific examples of useful coupling solvents include ethanol, n-propanol, isopropyl alcohol, ethylene glycol monobutyl ether, ethylene glycol monoisobutyl ether, ethylene glycol monomethyl ether acetate, diethylene glycol monobutyl ether, diethylene glycol monoethyl ether acetate, propylene glycol monopropyl ether, methoxy acetone, and the like.

The next material that is employed in the invention is polyvinyl alcohol. The polyvinyl alcohol employed in the invention is typically prepared by hydrolysis of polyvinyl acetate, and the most useful polyvinyl alcohol polymers for use in the invention are hydrolyzed to an extent of from about 85 to about 91 percent, and have molecular weights such that a 4 percent solids solution of the polyvinyl alcohol in water has a viscosity of from about 4 to about 25 centipoises at 25° C.

The proportions of the components have not been found to be narrowly critical. As a general rule, it is desirable to obtain as high solids a dispersion as possible. For preparing dispersions containing from about 40 to about 50 weight percent of phenolic resin, the percentage being based on the total weight of the dispersion, it has been found broadly that the proportion of coupling solvent can vary from about 15 volume percent to about 30 volume percent of the water/coupling solvent portion of the formulation. After preparation, the dispersion can be mixed with added water, if desired, to reduce the coupling solvent proportion to the 5–10 volume percent range. It has been found that the dispersions containing from about 15 to about 20 volume percent of coupling solvent have the best freeze-thaw stabilities. All percentages of coupling solvent are based upon the water/coupling solvent portion of the formulation.

The polyvinyl alcohol is employed in an amount sufficient to form and stabilize the dispersion. For instance, amounts from about 5.25 to about 13 weight percent of the phenolic resin/polyvinyl alcohol portion of the formulation have been found to be satisfactory. While more could be used, if desired, certain properties, such as water sensitivity, of the coating prepared from the dispersion could tend to be adversely affected if more polyvinyl alcohol were employed. As the proportion of polyvinyl alcohol becomes less than 5.25 percent, the stability of the dispersion tends to be reduced.

The phenolic resin is dispersed in the mixture of water, coupling solvent, and polyvinyl alcohol, using shearing agitation. The agitator can be a spinning propellor or disc, a rotating blade, or other agitator that imparts shearing force to the mixture. The time required for the mixing varies, depending on factors such as size of batch in relation to equipment, nature and proportion of ingredients, and the like. As a general rule, from about 10 to about 60 minutes are required to complete the mixing.

The amount or degree of shearing agitation cannot be quantified. But it has not been found to be narrowly critical, and it is well within the skill of the art to determine the requisite amount of shearing agitation for particular cases.

The examples set forth below illustrate certain aspects of the invention.

In the Examples, all parts are by weight unless otherwise stated.

EXAMPLE 1

Preparation of Aqueous Dispersions of a Heat Reactive Phenolic Resin

Phenolic Resin A, a bisphenol-A formaldehyde resin, was employed in this Example. The resin was prepared in the following manner: One hundred parts (by weight) of bisphenol-A were reacted with 77 parts 40% aqueous formaldehyde in the presence of 1.2 parts of 25% aqueous sodium hydroxide for about 1.5 hours at 95° C. including heat up time. After cooling to 70° C., there was added 0.6 parts 41% aqueous phosphoric acid and 0.002 parts antifoam agent (UCC Silicone R-12). The reaction mass was dehydrated until a temperature of 95° C. at 27 inches of mercury vacuum was reached. After a sample reached a 150° C. hot plate gel time of 230 seconds, the molten resin was discharged to coolers and subsequently crushed to about a 30 mesh particle size.

The solid resin obtained did not sinter and had a light color (about Gardner 1).

Aqueous dispersions of the above resin were prepared according to the formulations shown below:

Table I

|  | A | B | C | D | E |
|---|---|---|---|---|---|
| 80/20 (xVol)[1] Water/Ethanol | 122 | | | | |
| 80/20 (xVol) Water/n-propanol | | 122 | | | |
| 80/20 (xVol) Water/ethylene glycol monobutyl ether | | | 122 | | |
| 80/20 (xVol) Water/Methanol | | | | 122 | |
| 80/20 (xVol) Water/Propylene glycol/monopropyl ether | | | | | 122 |
| Polyvinyl alcohol (88% HYD, 4–6 cp at 4%)[2] | 7.5 | 7.5 | 7.5 | 7.5 | 7.5 |
| Phenolic Resin A | 92.5 | 92.5 | 92.5 | 92.5 | 92.5 |
| Theory N.V. = 45%[3] | | | | | |

[1]"xVol" means "by volume"
[2]"88% HYD" = 88% hydrolyzed "4–6 cp at 4%" = 4–centipoises at 4 weight per cent in water at 25° C.
[3]"N.V." means "non-volatile" or "solids" portion of the dispersion The water/solvent and polyvinyl alcohol were mixed in a Waring Blender at low speed until a solution was obtained. The phenolic resin was then gradually added and the blender speed was gradually increased at the same time. High speed agitation was then maintained until a temperature of 50°–55° C. was attained (the heat generated resulted from blender shear). At this point, smooth dispersions had formed and the formulations were discharged to jars. The viscosities of the dispersions were determined to be as follows:

|  | A | B | C | D | E |
|---|---|---|---|---|---|
| Brookfield Visc. cp. | 1320 | 1750 | 2450 | 1220 | 1660 |

Rechecking the above dispersions four months later indicated no settling of material and excellent stability.

The above dispersions were directly used to cast 5 mil wet films on phosphatized steel panels. With no air dry time, only the formulations containing ethylene glycol monobutyl ether and propylene glycol monopropyl ether produced smooth, bubble or crater free coatings when baked for 20 minutes at 350° F. After a 10 minute air dry followed by a bake at 350° F. for 20 minutes, all the formulations formed commercially acceptable coatings except the one containing methanol which still showed a few craters. All the 1.3 mil baked coatings were light colored, clear and had a pencil hardness of 5H. The dispersions had cross-linked to the same extent as evidenced by a common passing (unaffected) of a 30 minute boiling water test and 5 minute spot tests with ethanol, toluene, and methyl ethyl ketone. Coatings based on formulation C were subjected to 500 hours water immersion at 100° C. (ASTM D-870), 500 hours 100% humidity (ASTM D-2247) and 500 hours salt spray (5% NaCl soln. at 95° F.) (ASTM B-1117). In the first two tests, no change was noted. While the score line in the salt spray test showed on a 1/32 to 1/16 inch creepback, no blistering or underfilm corrosion was observed over the rest of the panel. The above coatings properties were considered excellent.

CONTROL 1

Using the materials listed below in Table II in place of the polyvinyl alcohol, it was attempted to make dispersions by the procedure of Example 1. The coupling solvent employed was ethylene glycol monobutyl ether. The results are displayed in Table II.

Table II

| Alternate Colloid | Dispersion Performance |
|---|---|
| Polyethylene glycol 20000 M.W. Polyox WSP-205 (UCC) | -2 layer emulsion -coagulated |
| Carboxymethyl Cellulose | -2 layer emulsion |
| Hydroxyethyl Cellulose QP-4400 (UCC) | -Fair Dispersion (rough, low gloss coating) |
| Colloid SV Protein polymer | -Semi-gel; dilution caused coagulation |
| Polyacrylamide | -Semi-gel; dilution caused coagulation |
| Soluble starch | -Unstable dispersion; settled in 2 hours |
| Gum Arabic | -Fair dispersion. Coating rough and not corrosion resistant |

EXAMPLE 2

Phenolic Dispersions in Various Other Water/Coupling Solvents

Using the same formulation and method as in Example 1, various other coupling solvents were evaluated for use in phenolic dispersions and their subsequent coatings performance. All the coupling solvents were tested at an 80/20 volume ratio of water/solvent:

| Formulation | Parts by Weight |
|---|---|
| 80/20 H$_2$O/Coupling Solvent | 122 |
| Polyvinyl Alcohol (as in Ex. 1) | 7.5 |
| Phenolic Resin A | 92.5 |

Properties of the dispersions and observations of the baked coatings were recorded as follows:

| Test Coupling Solvent | Dispersion Brookfield Viscosity cp, at 25° C. | Coating Appearance |
|---|---|---|
| Diethylene glycol monomethyl ether | 670 | Low Gloss |
| Diethylene glycol monoethyl ether | 1900 | Few Craters |
| Diethylene glycol monobutyl ether | 1620 | Satisfactory |
| Propylene glycol monomethyl ether | 750 | Few Craters |
| Isopropyl alcohol | 1750 | Excellent |
| Ethylene glycol monophenyl ether | 2100 | Low gloss, Specks |
| Ethylene glycol monomethyl ether acetate | 1080 | Excellent |
| Diethylene glycol monoethyl ether acetate | 820 | Excellent |
| Methyl ethyl ketone | 1350 | Medium Craters |
| Ethylene glycol monomethyl ether | 880 | Low Gloss, Few Craters |

Those solvents rated above as producing satisfactory or excellent films were judged to be commercially useful. The other solvents, while workable in the sense of facilitating dispersion formation, did not produce defect-free films and were therefore less preferred. Blends of the latter solvents in a 1:1 ratio with the preferred solvents above or with those preferred in Example 1 produced more satisfactory coatings, but were still subject to occasional cratering or eyeing unless extreme cleanliness was observed (dust free operations).

CONTROL 2

Comparison of Solvent Borne Formulation With Example 1

A resin made exactly as the phenolic resin of Example 1 was dissolved in ethylene glycol monoethyl ether acetate at 50% solids. To forty (40) parts by weight of this solution, 0.05 parts of Union Carbide Silicone L-5340 (leveling agent) was added and a 4 mil wet film was cast on phosphatized steel. After baking at 350° F. for 20 minutes, the resulting coatings were tested as in Example 1. The results were essentially the same. This similarity of performance indicated that the aqueous dispersions of Example 1 were fully as useful as the conventional solvent based coatings illustrated by this experiment.

EXAMPLE 3

Aqueous Dispersions of Other Heat Reactive Phenolic Resins (and Scale Up)

Other heat reactive, commercial phenolic resins were dispersed in water/coupling solvent to form useful coatings formulations. Phenolic resin B, an 80/20 phenol/cresol formaldehyde copolymer (61.6 formaldehyde factor*), and phenolic resin C, a phenol-formaldehyde (90.4 formaldehyde factor) resin, were chosen as representative solid heat reactive resins for dispersion testing as shown below:

Table III

| Dispersion Formulations | Parts by Weight | |
|---|---|---|
| | A | B |
| 80/20 (xVol.) Water/Propylene Glycol monopropyl ether | 600 | 488 |
| Polyvinyl alcohol (88% HYD. 4–6 cp at 4%) | 30 | 25 |
| Polyvinyl alcohol (88% HYD. 21–24 cp at 4%) | — | 5 |
| Phenolic Resin B | 370 | — |
| Phenolic Resin C | — | 370 |

*Formaldehyde Factor = parts by weight of 40% aqueous formaldehyde/100 parts phenol monomer A laboratory size Cowles Dissolver was fitted with a 4 inch blade and a one-half gallon stainless steel mixing container which was jacketed with a heating mantle. The water/coupling solvent and polyvinyl alcohol were first mixed and heated to about 60° C. until a solution resulted. The phenolic resin in rough powder form (about 30 mesh U.S. Sieve) was then added over about 3 minutes with increasing agitation. The agitation was increased to 5400 rpm and the dispersion formed over a 4 minute period while the temperature rose to 65° C. Part of the heat was generated by mechanical shear energy and part was supplied by the electric heating mantle. Both resins were dispersed in the above manner and were discharged hot to lined cans. The dispersions had the following viscosities at 25° C.

| | Dispersion | |
|---|---|---|
| | A | B |
| Brookfield Visc., cp | 4140 | 2000 |
| % Solids | 40% | 45% |

Both of the above dispersions were diluted to about 360 centipoise with 80/20 (xVol) water/ethylene glycol monobutyl ether and then 5 mil films of each were cast on phosphatized steel. After baking for 20 min. at 350° F., the resulting smooth coatings were tested as in Example 1. The results are tabulated below:

Table IV

| | Formulation | |
|---|---|---|
| | A | B |
| Film Thickness, mil. | 1.0 | 1.1 |
| 5 min. solv. ethanol | 10 | 10 |
| toluene methyl ethyl ketone | 10 | 10 |
| 30 min. boiling water | Slight Blush Recovered | No effect |
| 500 hour H$_2$O soak, 100° F. | 10 | 10 |
| 500 hour 100% humidity | 10 | 10 |
| 500 hour salt spray, 95° F. creep | none | none |
| blist. | 8F | 8M |
| underfilm corrosion | 9T2 | 7T2 |

10 = Best performance rating

While the above results are just under the near perfect performance of the coatings in Example 1, they were considered satisfactory for many primer applications. A stability check after two months indicated the dispersions of this example were still useful with no settling or agglomeration noted.

EXAMPLE 4

Phenolic Dispersions In Various Polyvinyl Alcohol Types

Using the phenolic resin of Example 1, dispersion formulations containing various polyvinyl alcohols were prepared in a Waring Blender to a final temperature of 60° C. (see Table VII).

Formulation J did not form the desired oil in water type dispersion while formulation K formed both types in two layers. Formulations D and E were initially acceptable, but after an overnight aging, showed settling of dispersed particles. The other dispersions were all stable and were diluted to 360 cp viscosity with 80/20 (xVol) water/ethylene glycol monobutyl ether for application as coatings as in Example 1. After baking, the film test results were as shown in Table V:

Table V

| Formulation | A | B | C | F | G | H | I |
|---|---|---|---|---|---|---|---|
| Visual Leveling | Exc. | Exc. | Exc. | Exc. | Exc. | Exc. | Exc. |
| Visual Gloss | Fair | Exc. | Exc. | Exc. | Exc. | Exc. | Exc. |
| 30 min. Boil H$_2$O | N.C. | N.C. | N.C. | N.C. | Blush | N.C. | N.C. |

(N.C. = no change)

The specifications of the various polyvinyl alcohols used are shown in Table VI:

Table VI

| | Visc., 4% Aq. Soln. | % Hydrolysis |
|---|---|---|
| Polyvinyl Alcohol I | 40–50 | 87–91 |
| Polyvinyl Alcohol II | 21–25 | 87–91 |
| Polyvinyl Alcohol III | 4–6 | 87–91 |
| Polyvinyl Alcohol IV | 4–6 | 85.5–88.7 |
| Polyvinyl Alcohol V | 2.4–3 | 72.9–77 |
| Polyvinyl Alcohol VI | 4–6 | 98.5–100 |

The experimental results indicated that polyvinyl alcohol types V and VI did not permit coatable, uniform dispersions to form and were therefore not useful. Other results above indicated the polyvinyl alcohols in the 85–91% hydrolyzed range effected good dispersions and useful coatings. The use of the higher molecular weight grade (I) resulted in high dispersion viscosites and poor coating flow (lower gloss). The more preferred types were II, III and IV. Testing of dispersion stability and boiling water resistance indicated the useful range of polyvinyl alcohol content was about 6 to 13% of the vehicle formulation solids. Work done subsequent to this Example 4 indicates that the effective range of polyvinyl alcohol proportion extends down to about 5¼ weight percent of the phenolic resin/polyvinyl alcohol portion of the formulation.

Table VII

|  | Parts By Weight | | | | | | | | | | |
|---|---|---|---|---|---|---|---|---|---|---|---|
|  | A | B | C | D | E | F | G | H | I | J | K |
| Polyvinyl Alcohol I | 7.5 | | | | | | | | | | |
| Polyvinyl Alcohol II | | 7.5 | | | 5.0 | | | 6.25 | | | |
| Polyvinyl Alcohol III | | | 7.5 | 5.0 | | 12.5 | 15 | | | | |
| Polyvinyl Alcohol IV | | | | | | | | | 7.5 | | |
| Polyvinyl Alcohol V | | | | | | | | | | 7.5 | |
| Polyvinyl Alcohol VI | | | | | | | | | | | 7.5 |
| 80/20 (xVol) Water/ ethylene glycol monobutyl ether | 122 | 122 | 122 | 122 | 122 | 122 | 122 | 122 | 100 | 122 | 122 |
| Phenolic Resin A | 92.5 | 92.5 | 92.5 | 95.0 | 95.0 | 87.5 | 85 | 93.75 | 92.5 | 92.5 | 92.5 |
| 16 Hour Stability, 25° C. | OK | OK | OK | SETTLED | SETTLED | OK | OK | OK | OK | WATER IN OIL DISP. | 2 Layer DISP. |
| Brookfield Visc., cp. | 32000 | 18700 | 2350 | — | — | 4400 | 5100 | 11500 | 5400 | — | — |

EXAMPLE 5

Phenolic Epoxy Codispersions

Phenolic-epoxy combinations have been used in solvent solutions for chemical resistant coatings and can liners. This example illustrates that the heat reactive phenolics can be formulated with a solid bisphenol-A based epoxy resin (Epon 1001-epoxy eq. weight 525–540 g/g-mole) in the aqueous dispersions of the invention. The following formulations were prepared in the Waring Blender:

Table VIII

|  | Parts By Weight | | |
|---|---|---|---|
|  | A | B | C |
| Water | 122 | 122 | 122 |
| Polyvinyl Alcohol (88% HYD, 4–6 cp at 4%) | 7.5 | 7.5 | 7.5 |
| (Epoxy resin (eq. wt. 525)) Solution | 67.0 | 67.0 | 67.0 |
| (Ethylene Glycol Monobutyl Ether) | 25.5 | 25.5 | 25.5 |
| Phenolic Resin A | 67.0 | — | — |
| Phenolic Resin B | — | 67.0 | — |
| Phenolic Resin C | — | — | 67.0 |

In the above formulations, the water and polyvinyl alcohol were first blended to a solution and then the phenolic resin was dispersed in the aqueous solution. The premixed epoxy resin-solvent solution was then added to the blender and agitated to a temperature of 55°–60° C. Stable dispersions of 100–200 cp viscosities were obtained after cooling in each case. The preparations were directly cast on phosphatized steel panels as 5 mil wet films which were air dried 5 minutes and then baked for 20 minutes at 350° F. The resulting smooth films were tested with the results shown below in Table IX. Solid epoxy resins with equivalent weights up to about 1025 (Epon 1004) have been co-dispersed with phenolic resins in this manner.

Table IX

| Formulations | A | B | C |
|---|---|---|---|
| 5 min. Spot Solvent | | | |
| Ethanol | 10 | 10 | 10 |
| Toluene | 10 | 10 | 10 |
| M.E.K. | 10 | 10 | 10 |
| 30 min. 5% NaOH | 10 | 10 (Slight Color) | 10 (Slight Color) |
| 30 min. Boiling H₂O | N.C. | N.C. | N.C. |
| Film Thickness, mils | 0.9 | 0.9 | 0.9 |
| Pencil Hardness | 5H | 4H | 5H |
| 500 hours Salt Spray | | | |
| Creep (in.) | NONE | NONE | NONE |

Table IX-continued

| Formulations | A | B | C |
|---|---|---|---|
| Blister | 9F+ | 8F | 6M |
| Corrosion 500 hours 100% Humidity | NONE | NONE | 9T2 |
| Blistering | NONE | 8F | 8F |
| Corrosion 500 hours Water Immersion 100° | NONE | NONE | NONE |
|  | No Changes For All | | |

(10 = Best Rating, N.C. = No Change)

EXAMPLE 6

Alternate Method For Phenolic-Epoxy Dispersions

To a Waring Blender, there was charged:

|  | Parts By Weight |
|---|---|
| Ethylene glycol monobutyl ether | 27.6 |
| Water | 69.4 |
| Polyvinyl alcohol (88% HYD, 4–6 cp at 4%) | 7.5 |

After dissolving the above mixture, a solid epoxy resin (equiv. wt. 525), 46 parts by weight, was added and dispersed with high speed agitation to 65° C. Then, 46.5 parts by weight of phenolic resin A was added and also dispersed to 65° C. The resulting codispersion was diluted with 33.0 parts by weight water and had a viscosity of 220 cp at 25° C. and 40% N.V. Coatings were prepared as in Example 1 and tested with the following results:

Table X

| 5 min. Spot Solvent | |
|---|---|
| Ethanol | No Change |
| Toluene | No Change |
| Methyl Ethyl Ketone | No Change |
| 30 min. 5% NaOH | No Change |
| Pencil Hardness | 3H |
| Film Thickness, mil. | 1.0 |
| Reverse Impact in.-lbs. | 2 |
| 500 Hour Salt Spray | |
| Creep | None |
| Blister | 6 Medium |
| Corrosion | None |
| 500 Hour Water Soak, 100° F. | No Change |
| 500 | |
| 500 Hour 100% Humidity | No Change |

This example illustrated that larger amounts of epoxy may be conveniently codispersed if the above order of addition is followed instead of that used in Example 5.

EXAMPLE 7

Coupling Solvent Level For Phenolic Dispersions

The amount of coupling solvent necessary to easily form the dispersions of the invention was investigated using two of the more preferred solvents from Example 1. The following formulations were prepared using the methods of Example 1:

Table XI

| Volume Ratio | A | B | C | D | E | F | G |
|---|---|---|---|---|---|---|---|
| 70/30 H$_2$O/ethylene glycol monobutyl ether | 122 | | | | | | |
| 85/15 H$_2$O/ethylene glycol monobutyl ether | | 122 | | | | | |
| 90/10 H$_2$O/ethylene glycol monobutyl ether | | | 122 | | | | |
| 95/5 H$_2$O/ethylene glycol monobutyl ether | | | | 122 | | | |
| 90/10 H$_2$O/propylene glycol monopropyl ether | | | | | 122 | | |
| 90/5 H$_2$O/propylene glycol monopropyl ether | | | | | | 122 | |
| Water 100% | | | | | | | 122 |
| Polyvinyl Alcohol 88% HYD, 4–6 cp at 4% | 7.5 | 7.5 | 7.5 | 7.5 | 7.5 | 7.5 | 7.5 |
| Resin A | 92.5 | 92.5 | 92.5 | 92.5 | 92.5 | 92.5 | 92.5 |

After dispersing the above in the blender to 55°–60° C., the dispersions were cooled to 25° C. and checked for viscosity, stability and coating properties where applicable. The results were as follows:

Table XII

| Formulation | Viscosity cp. | Stability 24 hrs. | Baked Coatings |
|---|---|---|---|
| A | 5200 | Excellent | Equiv. to Example 1-C |
| B | 4500 | Excellent | " |
| C | 4200 | Very Slight Settle | — |
| D | 3250 | Slight Settle-Slight Grit | — |
| E | 3000 | Slight Grit | — |
| F | 3100 | Slight Settle-Large Grit | — |
| G | 3000 | Medium Settle-Large Grit | — |

Only formulations A and B formed satisfactory dispersions and commercially acceptable coatings. The minimum coupling solvent content was then about 15% by volume of the volatiles. The other compositions exhibited various degrees of settling and large undispersed particles which appeared as a gritty deposit. The maximum desired coupling solvent under the current air pollution laws (USA) is 20 volume %, but higher levels up to 30 volume % are workable in the invention. It was further noted that while about 15 volume % solvent was necessary to make or form the post dispersions at 45–50% N.V., thinning for application could be performed with water or lower ratios of coupling solvent to water so that the final applied dispersion could contain as low as 5–10 volume percent solvent in the volatile portion of the formulation. Better results are obtained however, (such as gloss, leveling and freeze-thaw stability) by maintaining the original dispersion water/solvent balance.

EXAMPLE 8

Formulation of Phenolic Dispersions With Acrylic Latices

The phenolic dispersion of Example 1-C was chosen to test the versatility of the dispersions of the invention. While said dispersion forms a coating when baked alone, it was also found to be a useful modifier for various acrylic latices to form corrosion resistant coatings. The following formulations illustrated the point:

Table XIII

| | A | B | C |
|---|---|---|---|
| Phenolic Dispersion 1-C, 45% N.V. | 22.3 | 17.8 | 35.6 |
| Acrylic Latex 1* 38.33% N.V. | 104.4 | — | — |
| Acrylic Latex 2 45% N.V. | — | 89 | — |
| Acrylic Latex 3 46% N.V. | — | — | 87 |
| 28% Aq Ammonia | 0.5 | — | 0.5 |

Table XIII-continued

| | A | B | C |
|---|---|---|---|
| 80/20 (Vol) Water/ethylene glycol monobutyl ether | 6.0 | 2.0 | 6.0 |

*Acrylic Latex 1 Styrene (40) butyl acrylate (40) with acrylamide (5) hydroxyethyl methacrylate (19) methacrylic acid (5).
Acrylic Latex 2 Butyl acrylate (65) acrylonitrile (32) methacrylic acid (3).
Acrylic Latex 3 Styrene (47) ethyl acrylate (49) methacrylic acid (4). (Numbers are parts by weight)

After the above formulations were mixed, 5 mil wet films were cast on phosphatized steel, flash dried for 5 minutes and then baked for 20 minutes at 350° F. The following results were obtained in coatings tests:

TABLE XIV

| Formulation | A | B | C |
|---|---|---|---|
| Pencil Hardness | 2H | 3H | 3H |
| Film Thickness, mils | 1.4 | 1.2 | 1.3 |
| Reverse Impact, in.- lbs. | 120 | 160 | — |
| 30 min. Boiling Water | Slight Blush Recovers | No Change | Slight Blush Recovers |
| 500 Hours Salt Spray, 95° F | | | |
| Creep, in. | 5/32 | 1/32 | 1/32 |
| Blister | 9F | None | 8F |
| Corrosion | 9T2 | None | 9T2 |

The acrylic latices alone did not form corrosion resistant films. While melamine/formaldehyde resin addition will crosslink the above acrylic films, poor adhesion was observed in the salt spray tests with melamine/formaldehyde.

EXAMPLE 9

Preparation Of A Phenolic Dispersion For Carbonless Copy Paper

A phenolic novolak resin prepared from 20% (by weight) phenol — 80% t-butylphenol mixture reacted with formaldehyde at a formaldehyde factor of 50 and in the presence of an acid catalyst, was obtained as a solid lump resin which was water insoluble. The resin had a ring and ball softening point of 200° F.

A dispersion of the above resin was prepared as follows. Into a Waring blender, there was charged 122 parts by weight (pbw) of an 80/20 by volume mixture of water/propylene glycol monopropyl ether (UCC Propasol Solvent P). Ten parts of a low molecular weight, 88% hydrolyzed polyvinyl alcohol polymer (described in Example 1) was then added with agitation. After the polymer dissolved, the phenolic resin (90 pbw) was gradually added with increasing agitation and heat generation until a temperature of 65° C. was obtained. At this point a smooth milky white dispersion was obtained. After discharging and cooling to room temperature, the dispersion was determined to contain 45% N.V. and to have a viscosity of 710 cp.

A sample of the above phenolic dispersion (110 pbw) was diluted with the 80/20 water solvent mixture used above (10 pbw) to a viscosity of 310 cp and applied to #1 filter paper with a #16 wire wound rod. The paper was dried at 100° C. for 20 minutes. Using an NCR commercial teletype topsheet, a line was made on the above copy sheet by dragging it under a 300 gram weighted stylus. The image was bright blue, sharp and compared favorably (rated excellent) to a copy sheet image made from the commercial teletype system.

Standard Evaluation Procedure

The standard procedure for carbonless copy paper testing was the following

The phenolic dispersions were thinned to 10-20% solids and sprayed or wire wound rod coated onto #1 filter paper. After force drying, e.g., for 10 minutes at 110° C., the copy papers were placed under commercial topsheets which contained encapsulated dye mixtures on the reverse side. A three hundred gram weighted stylus was used to apply a standard pressure line to the topsheet-copysheet assembly and then the copy sheet was immediately inspected for speed of color development and image brightness. Image stability after three weeks under fluorescent lighting was also noted. As controls, the commercially available topsheet and copy sheets were used, a rating of excellent was considered equivalent to the commercial controls performance.

EXAMPLE 10

Preparation of Phenolic Dispersion For Carbonless Copy Paper — Mixed PVOH

To a Waring blender, there was charged 122 pbw of an 80/20 (by vol.) water-propylene glycol monopropyl ether mixture. Five pbw of a low molecular weight polyvinyl alcohol polymer (PVOH II from Table VI, above) and 2.5 parts of a medium molecular weight polyvinyl alcohol polymer (PVOH III from Table VI, above) were dissolved in the mixture with agitation. There was added 92.5 parts of the phenolic resin used in Example 9 with increasing agitation and heat until a temperature of 65° C. was reached. A smooth dispersion resulted which had a room temperature viscosity of 4750 cp at 45% N.V. A sample of this dispersion was diluted to 10% solids and sprayed onto #1 filter paper. After force drying for 20 minutes at 100° C., the copy paper was tested as in Example 9. The image produced was rated excellent compared to a commercial control.

The original 45% N.V. dispersion above was frozen at 0° F. for 16 hours, thawed and rechecked for viscosity and possible coagulation or settling. The dispersion had returned to its original condition and was judged freeze-thaw stable.

A second type of control was also run. The phenolic resin used in Example 9 was dissolved in toluene at 10% solids and applied to paper as above. The dried copy paper was also tested under the commercial topsheet as above. The image formed was compared to that derived from the dispersion coated sheet and the two were judged to be equivalent.

EXAMPLE 11

Phenolic Dispersions With Varying Water-Solvent Ratios

The following dispersion formulations were prepared as in Example 9:

|  | Parts By Weight | | |
|---|---|---|---|
|  | A | B | C |
| 85/15 (Vol. ratio) Water/Propasol P | 122 | — | — |
| 90/10 (Vol. ratio) Water/Propasol P | — | 122 | — |
| 95/5 (Vol. ratio) Water/Propasol P | — | — | 122 |
| Low M.W. Polyvinyl Alcohol (88% Hyd.) | 5.0 | 5.0 | 5.0 |
| Med. M.W. Polyvinyl Alcohol (88% Hyd.) | 2.5 | 2.5 | 2.5 |
| Phenolic Resin of Ex. 9 | 92.5 | 92.5 | 92.5 |

After dispersing the above in a Waring blender to 65° C., the dispersions were cooled to room temperature. Dispersions B and C generated heavy foam during their preparation while A did not. After setting for 4 hours, the dispersions were inspected for stability characteristics. Dispersion B showed slight settling of soft resin while dispersion C showed the same condition along with large, gritty undispersed resin particles. Dispersion A was smooth and stable. The contribution of the coupling solvent appeared to be twofold. The solvent softens the phenolic resin and enables the dispersion to form quickly and it also lowers the surface tension of the system so that less foam persists. Judging from the results of Examples 9-11, the optimum level of coupling solvent for the carbonless copy paper coating application is of the order of 15 to 20 volume percent of the water-solvent portion of the formulation.

The above satisfactory dispersion A was also diluted to 10% N.V. with the corresponding water-coupling solvent mixture, sprayed on #1 filter paper, dried and tested for image reproduction as in the previous example. The image was rated excellent and equivalent to the image formed by the dispersion coated paper of Example 10.

EXAMPLE 12

Preparation Of A Larger Batch Of Phenolic Dispersion

To a one half gallon stainless steel container fitted with an electric heating mantle, there was charged 488 pbw of an 80/20 (vol. ratio) water/Propasol P mixture. The container was agitated with a Cowles dissolver fitted with a 3 inch disk blade. Twenty pbw of low molecular weight and 10 pbw of medium molecular weight polyvinyl alcohol (88% hyd.) were dissolved in the mixture. While increasing agitation and applying external heat, 370 pbw of the phenolic resin (Ex. 9) was added. At maximum agitation (5400 rpm), the mixture formed a smooth dispersion at 65° C. The addition and dispersion of the phenolic resin took 20 minutes. After cooling, the dispersion was determined to have a viscosity (Brookfield) of 4750 cp at 45% N.V.

EXAMPLE 13

Modified Phenolic Dispersion For Copy Paper Coatings

In prior art methods, a water-borne coating system containing phenolic novolak resin was prepared by first grinding the phenolic resin to a dust and then dispersing this powder into a mixture of styrene butadiene latex and clay along with additional wetting agents and protective colloids. The dry grinding of the phenolic resin required special equipment and represented a hazard since fine phenolic dusts in the air can form explosive mixtures.

An alternate method was to charge all the above ingredients to a ball mill and wet grind the phenolic resin into the mixture. While this approach was less dangerous than the dry grinding system, it was time consuming and still required extra equipment and extended cleanup.

It was found that the phenolic dispersions of this invention can be simply blended with carboxylated styrene butadiene latexes and optionally the other mentioned ingredients to form copy paper coatings. The blending operation could be carried on separately or immediately after forming the phenolic dispersion on the same Cowles dissolver and thus save time and eliminate all the disadvantages cited above. The following blends were made using a typical solid ratio of phenolic/latex (SBR):

|  | Parts By Weight | | |
| --- | --- | --- | --- |
|  | A | B | C |
| Phenolic Dispersion Ex. 12 45% N.V. | 24.7 | 24.7 | 24.7 |
| Carboxylated SBR Latex 1* 48.5% N.V. | 12.2 | — | — |
| Carboxylated SBR Latex 2* 46.9% N.V. | — | 12.6 | — |
| Carboxylated SBR Latex 3* 42.0% N.V. | — | — | 14.0 |
| 80/20 (vol. ratio) H₂O/Propasol P | 48 | 48 | 46 |

*SBR Latices
1"TYLAC-5025" Standard Brands Chemical Ind., Inc., Dover, Del.
2"NAUGATEX-J-2752" Uniroyal Inc., Naugatuck, Conn.
3"NAUGATEX-J-3770" Uniroyal Inc., Naugatuck, Conn.

After simple stirring to mix, the above formulations were sprayed on #1 filter paper and dried for 10 minutes at 110° C. Image reproduction tests were run as in Example 9. All three images were equally bright and sharp and were rated equal to those observed in Example 9.

EXAMPLE 14

Dispersion Of Another Resin

Phenolic novolaks other than that cited in Example 9 may be post dispersed in the system of the invention. A novolak consisting of 30% by weight bisphenol-A and 70% t-butyl phenol reacted with formaldehyde (formaldehyde factor = 35) was obtained from a conventional acid catalyzed reaction as a solid resin. This resin was used in the following dispersion preparation which was performed in the manner of Example 10:

|  | Parts by Weight |
| --- | --- |
| 80/20 (vol. ratio) Water/Propasol P | 122 |
| Low M.W. Polyvinyl alcohol | 5.5 |
| Med. M.W. Polyvinyl alcohol | 2.0 |
| Phenolic Resin | 92.5 |

The smooth dispersion was diluted with the corresponding water/solvent mixture to 10% N.V., sprayed on #1 filter paper and dried at 110° C. for 10 minutes. The resulting copy sheet was tested under commercial topsheets with the 300 gram stylus. The image formed was rated good to excellent and just below the quality of the previous examples.

While different phenolic resins might give slightly different responses to copy sheet color development, the dispersion and coating techniques of the invention are felt to be generally useful.

EXAMPLE 15

Preparation Of A Phenolic Dispersion With Low Speed Agitation

Using the phenolic novolak of Example 9, there was charged 370 pbw phenolic resin and 10.9 pbw Propasol Solvent P to a 3 liter Morton (baffled) flask equipped with a stirrer, thermometer, heating mantle, and dropping funnel. The resin and solvent were heated to 80° C. over 20 minutes and a solution of low M.W. (20 pbw) and medium M.W. (10 pbw) polyvinyl alcohol in water (491 pbw) was then metered into the mixture over a 25 minute period. Maximum agitation speed was 100-120 rpm and the temperature was maintained at 70°-80° C. After all the aqueous solution was added, 98.1 pbw Propasol P was also added. A smooth white dispersion had formed which was cooled to 45° C. and discharged. The resulting dispersion contained 40% N.V. and had a viscosity of 18,250 cp.

A sample was diluted and sprayed on #1 filter paper. Further drying and testing as in Example 9 showed the coated paper to be equally useful as a copy sheet.

This method is practical only with a low molecular weight novolak because the viscosity of the resin solvent solution (using the preferred amounts of coupling solvent) is too high for convenient use in conventional equipment. The fact that the viscosity (18,250 cps) of the 40% N.V. dispersion of this Example 15 is significantly higher than the viscosity of the 45% N.V. dispersion of Example 12 (4750 cps), wherein the same ingredients were used, indicates that the method of Example 15 may yield a less perfect oil-in-water dispersion.

Standard Procedure

A preferred standard procedure for producing the dispersion for the carbonless copy paper coating is the following:

1. Charge to mixing vessel fitted with a heating jacket or coils:

|  | Parts By Weight |
| --- | --- |
| Water | 51.0 |
| Propasol Solvent P | 18.0 |
| Polyvinyl Alcohol (Vinol-205) | 6.1 |

2. Agitate at low speed (800–1000 rpm — Cowles) and heat to 45°–50° C.
3. Add phenolic resin, 75 parts by weight, in at least two portions.
4. Gradually increase agitation to 1800 rpm and continue heating until a temperature of 75°–80° C. is reached.
5. Check dispersion with Hegman grind gauge. If no undispersed resin particles are observed at Hegman 7+, add 30.3 parts by weight water and continue dispersion to 75°–80° C.
6. Recheck dispersion with grind gauge, and discharge through a filter bag. Products should have a solids of 45% (±1) (20 min. at 300° F.) and a Brookfield Viscosity of about 800–1500 cp at 25° C.

Variations

Equipment
The Equipment used may be a Cowles Dissolver, a Henschel Mill, a Kady Mill, a Waring Blender or other medium to high speed/shear dispersing machine. In general, even though the agitation action produces heat, an additional heat supply to the mixing vessel will speed the formation of the dispersion. Low speed agitation will not produce the most desired dispersion even though a crude emulsion can be made. To maximize the batch capacity of the mixing vessel, baffles may be employed to lessen any vortex that may form.

Method

The order of addition in the above example was devised to minimize foam formation and time of preparation. Variations can be tolerated, but they may decrease batch size capabilities or increase time of preperation. Subsequent batches may be made without cleaning the equipment if the interval time is limited to a few hours.

Water

While deionized water is desirable, ordinary tap water will not harm the dispersion.

Dispersion Variables

The phenolic dispersions are generally made at the highest solids, but most easily handled viscosities. A solids content of 40-50% usually produces a filterable, stable, yet easily formulated system. Dilution of the dispersion may use water alone, but a 20/80 volume mixture of coupling solvent/water will maintain freeze-thaw stability better. The phenolic dispersions may be formulated with a variety of acrylic, vinyl, or rubber latices to produce modified systems. Since the dispersions are shear stable, pigments, fillers or other additives may be dispersed by the usual methods.

EXAMPLE 16

Contact Adhesive From Phenolic Dispersion And Latex

The phenolic dispersion shown in Example 1-E was repeated on a larger scale (8 times that shown) in a 1 gallon Waring Blender and also dispersed to a final temperature of 75° C. This dispersion was then formulated with the various latices shown in Table XV:

Table XV

|  | Parts By Weight | | | | | |
| --- | --- | --- | --- | --- | --- | --- |
|  | A | B | C | D | E | F |
| Phenolic Disp. 1-E, 45% N.V. | 84 | 66 | 65 | 52 | 65 | 52 |
| Acrylic Latex 4, 60% N.V. | 125 | 150 | — | — | — | — |
| "Neoprene 101", 47% N.V. | — | — | 125 | 150 | — | — |
| "Neoprene 102", 47% N.V. | — | — | — | — | 125 | 150 |
| % Solids | 54 | 56 | 46 | 46 | 46 | 46 |
| cp=Brookfield Visc. LVT#2 12RPM | 2350 | 1928 | 580 | 465 | 370 | 270 |
| Canvas/Canvas bond str.- Lbs./In. width | 16.0 | 17.0 | 7.0 | 7.6 | 7.0 | 7.6 |
| Canvas/Steel bond str.- Lbs/In. width | 10.8 | 12.0 | 7.6 | 9.8 | 7.4 | 9.0 |

The phenolic dispersion and latex were blended and coated onto canvas (10 oz. duck). After an "open time" drying of 45 minutes, the canvas/canvas and canvas/metal bonds were assembled by contact pressure only. After ageing for one week at 25° C., the above peel strength values were measured. Generally, for a non-filled system, the adhesives were judged to be good. In fact, other laminates of melamine-formaldehyde resin sheeting (FORMICA) which were bonded to wood with the above adhesives (A and B), could not be separated without breaking the substrate.

Acrylic latex 4 contained ethyl acrylate, acrylonitrile, acrylic acid and N-methylol acrylamide in a 93/4/2/1 weight ratio.

Neoprene 101 and 102 are DuPont products which are copolymers of 2-chlorobutadiene and methacrylic acid.

EXAMPLE 17

Contact Adhesive From Phenolic Dispersion and Acrylic Latex

The phenolic resin of Example 9 was dispersed as shown in the Standard Procedure to yield a 45% N.V. dispersion in 80/20 (xVolume) water/propylene glycol monopropyl ether. This dispersion was formulated into adhesives as follows:

Table XVI

|  | Parts By Weight | |
| --- | --- | --- |
|  | A | B |
| Phenolic dispersion 17 45% N.V. | 91 | 72 |
| Acrylic Latex 4 60% N.V. | 125 | 150 |
| % Solids | 52 | 54 |
| Brookfield viscosity, cps. | 1007 | 481 |
| Canvas/Canvas peel strength lbs./in. width | 9.5 | 12 |
| Canvas/Steel peel strength lbs./in. width | 9 | 14.5 |

The adhesives were applied and tested as in example 16. The results shown in the above Table XVI were also considered satisfactory. While the phenolic novolak resin used in this example formed a satisfactory adhesive with the acrylic latex, the phenolic resin used in Example 16 is considered more versatile in that heat set (reactive) adhesives can also be obtained in addition to the contact adhesives shown.

What is claimed is:

1. A process for producing a dispersion of a solid, substantially water-insoluble, phenolic resin in water, which process comprises subjecting a mixture of:
   (a) a pre-formed, solid, substantially waterinsoluble phenolic resin;
   (b) water;
   (c) a water miscible organic coupling solvent in an amount from about 15 to about 30 volume percent based upon the volume of water plus coupling solvent; and
   (d) a polyvinyl alcohol that is hydrolyzed to an extent of from about 85 to about 91 percent in an amount of from about 5¼ to about 13 weight percent based upon the weight of phenolic resin plus polyvinyl alcohol, to shearing agitation at a temperature and for a period of time sufficient to produce a stable dispersion of said phenolic resin in water.

2. The process of claim 1 wherein said process comprises adding said phenolic resin to a solution of polyvinyl alcohol in a water-coupling solvent mixture.

3. The process of claim 1 wherein the phenolic resin is a resole.

4. The process of claim 1 wherein the phenolic resin is a novolak.

5. The process of claim 1 wherein the polyvinyl alcohol has a molecular weight such that a four percent solids solution in water has a viscosity at 25° C. of from about 4 to about 25 centipoises.

6. The process of claim 1 wherein the coupling solvent has a boiling point within the range from about 75° C. to about 230° C.

7. The process of claim 1 wherein the coupling solvent is a member selected from the group consisting of ethanol, n-propanol, isopropyl alcohol, ethylene glycol monobutyl ether, ethylene glycol monoisobutyl ether, ethylene glycol monomethyl ether acetate, diethylene glycol monobutyl ether, diethylene glycol monoethyl ether acetate, propylene glycol monopropyl ether, and methoxy acetone.

8. The process of claim 3 wherein the resole is the reaction product of bisphenol-A and formaldehyde.

9. The process of claim 4 wherein the novolak comprises the reaction product of a parasubstituted phenol and formaldehyde, and wherein said novolak is suitable for use in a developer coating for carbonless copy paper.

10. The dispersion produced by the process of claim 1.

11. The dispersion produced by the process of claim 8.

12. The dispersion produced by the process of claim 9.

13. The process of claim 1 wherein the phenolic resin is codispersed with a solid bisphenol based epoxy resin.

14. The process of claim 13 wherein the epoxy equivalent weight of the epoxy resin is about 525–1025 g./g. mole.

15. The process of claim 13 wherein the epoxy resin is based on bisphenol-A.

16. The dispersion produced by the process of claim 13.

* * * * *